United States Patent
Hegna et al.

(10) Patent No.: US 10,241,218 B2
(45) Date of Patent: Mar. 26, 2019

(54) METHODS AND SYSTEMS FOR COMPUTING NOTIONAL SOURCE SIGNATURES FROM NEAR-FIELD MEASUREMENTS AND MODELED NOTIONAL SIGNATURES

(75) Inventors: Stian Hegna, Hovik (NO); Fabien Julliard, Oslo (NO)

(73) Assignee: PGS Geophysical AS, Oslo (NO)

( * ) Notice: Subject to any disclaimer, the term of this patent is extended or adjusted under 35 U.S.C. 154(b) by 1279 days.

(21) Appl. No.: 13/483,327

(22) Filed: May 30, 2012

(65) Prior Publication Data
US 2013/0325427 A1    Dec. 5, 2013

(51) Int. Cl.
*G06F 17/50* (2006.01)
*G01V 1/13* (2006.01)
*G01V 1/00* (2006.01)

(52) U.S. Cl.
CPC ............. *G01V 1/13* (2013.01); *G01V 1/006* (2013.01); *G01V 2210/50* (2013.01)

(58) Field of Classification Search
CPC . G06G 7/57; G01V 1/13; G01V 1/006; G01V 2210/50
USPC .......................................................... 703/2
See application file for complete search history.

(56) References Cited

U.S. PATENT DOCUMENTS

| | | | |
|---|---|---|---|
| 4,476,553 A | 10/1984 | Ziolkowski et al. | |
| 6,788,618 B2 | 9/2004 | Clayton et al. | |
| 7,218,572 B2 | 5/2007 | Parkes | |
| 7,782,708 B2 | 8/2010 | Christie et al. | |
| 2005/0259513 A1* | 11/2005 | Parkes | 367/23 |
| 2009/0043545 A1* | 2/2009 | van Manen et al. | 703/2 |
| 2010/0014382 A1 | 1/2010 | Yang et al. | |
| 2012/0087207 A1 | 4/2012 | Kostov et al. | |

(Continued)

FOREIGN PATENT DOCUMENTS

EP    2322955 A2    5/2011

OTHER PUBLICATIONS

Gilmore, Forrest R., "The growth or collapse of a spherical bubble in a viscous compressible liquid", Office of Naval Research, Report No. 26-4, Apr. 1, 1952; pp. 1-40.

(Continued)

*Primary Examiner* — Dwin M Craig

(57) ABSTRACT

Methods and systems for computing notional source signatures from modeled notional signatures and measured near-field signatures are described. Modeled near-field signatures are calculated from the modeled notional signatures. Low weights are assigned to parts of a source pressure wavefield spectrum where signatures are less reliable and higher weights are assigned to parts of the source pressure wavefield spectrum where signatures are more reliable. The part of the spectrum where both sets of signatures are reliable can be used for quality control and for comparing the measured near-field signatures to modeled near-field signatures. When there are uncertainties in the input parameters to the modeling, the input parameters can be scaled to minimize the differences between measured and modeled near-field signatures. Resultant near-field signatures are computed by a weighted summation of the modeled and measured near-field signatures, and notional source signatures are calculated from the resultant near-field signatures.

27 Claims, 14 Drawing Sheets

(56) References Cited

U.S. PATENT DOCUMENTS

2012/0222465 A1* 9/2012 Lippuner et al. .............. 73/1.75

OTHER PUBLICATIONS

Ziolkowski, A., et al., "The signature of an air gun array: Computation from near-field measurements including interactions", Geophysics, vol. 47, No. 10, Oct. 1982; pp. 1413-1421.
Parkes, G.E., The signature of an air gun array: Computation from near-field measurements including interactions—Practical considerations, Geophysics, vol. 48, No. 2, Feb. 1984, pp. 105-111.
Search Report issued in patent application No. 201370094/26, from the Eurasian Patent Office, dated Dec. 10, 2013, and English translation thereof, 4 pages.
Extended Search Report Issued in the European Intellectual Property Office for application 13169906.8, dated Mar. 13, 2015, 6 pages.

* cited by examiner

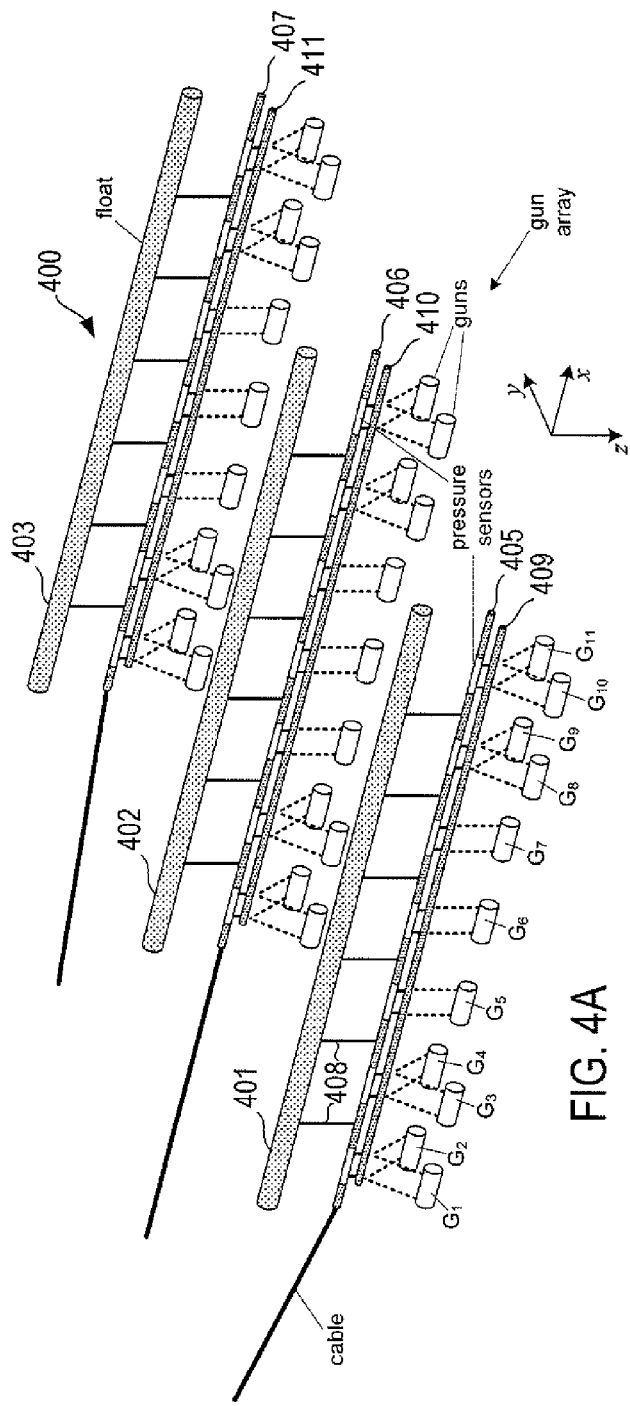
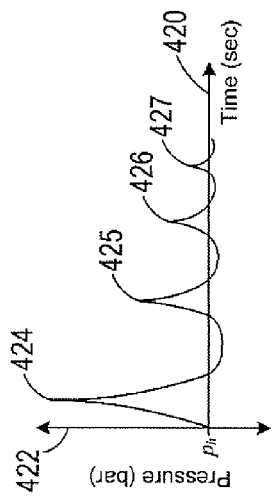
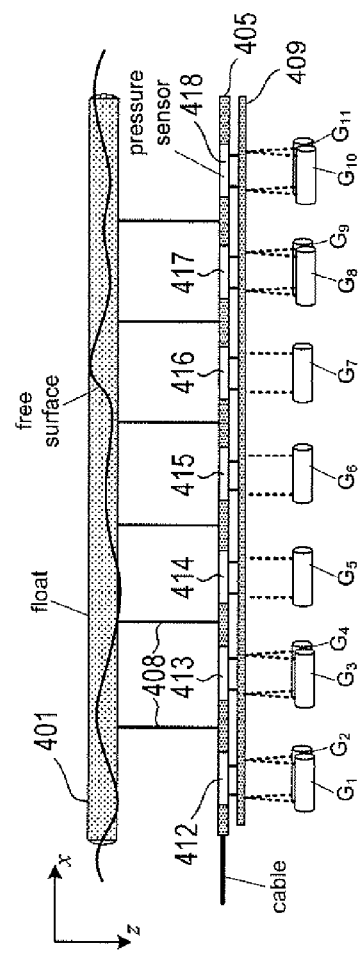
FIG. 4A
FIG. 4B
FIG. 4C

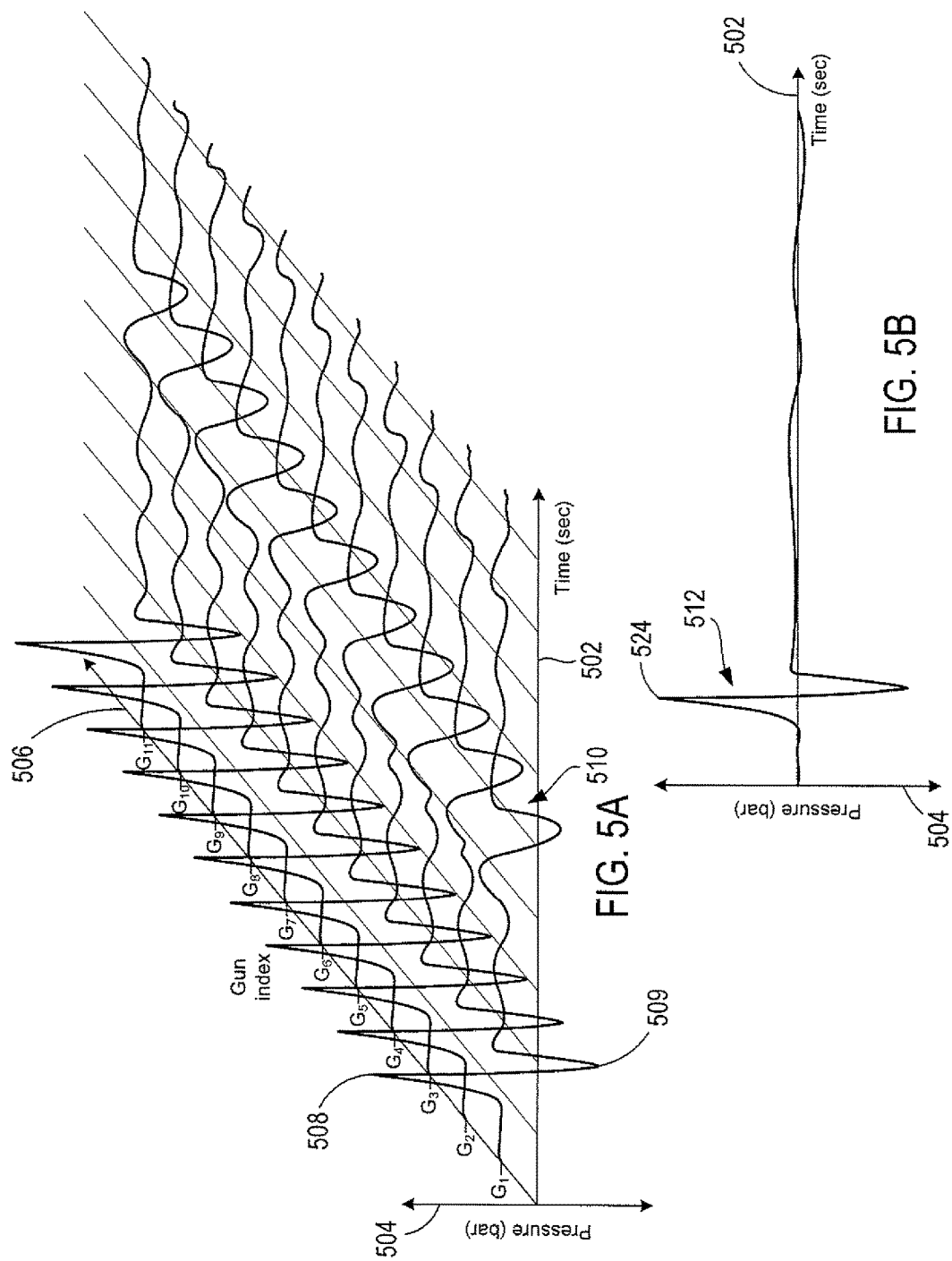

METHODS AND SYSTEMS FOR COMPUTING NOTIONAL SOURCE SIGNATURES FROM NEAR-FIELD MEASUREMENTS AND MODELED NOTIONAL SIGNATURES

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are essential for quantitative seismic interpretation and improved reservoir monitoring. For a typical marine seismic survey, an exploration-seismology vessel tows a seismic source and one or more streamers that form a seismic data acquisition surface below the surface of the water and over a subterranean formation to be surveyed for mineral deposits. The vessel contains seismic acquisition equipment, such as navigation control, seismic source control, seismic receiver control, and recording equipment. The seismic source control causes the seismic source, which is typically an array of source elements, such as air guns, to produce acoustic impulses at selected times. Each impulse is a sound wave that travels down through the water and into the subterranean formation. At each interface between different types of rock, a portion of the sound wave is refracted, a portion of the sound wave is transmitted, and another portion is reflected back toward the body of water to propagate toward the surface. The streamers towed behind the vessel are elongated cable-like structures. Each streamer includes a number of seismic receivers or sensors that detect pressure and/or velocity wavefields associated with the sound waves reflected back into the water from the subterranean formation.

In order to process seismic data measured at the acquisition surface to produce focused seismic images of a subterranean formation, accurate knowledge of a pressure wavefield created by the seismic source is desired. However, obtaining an accurate characterization of the source pressure wavefield is often met with difficulty. For example, the source pressure wavefield can be determined from pressure measurements taken within near fields of the source elements, but the measurements can be contaminated with noise caused by cross-talk and from the hydrophones picking up some of the motion caused by firing other powerful source elements in the vicinity of the hydrophone. Other techniques to accurately characterize the source pressure wavefield include modeling the source pressure wavefield. The models are typically calibrated with actual measurements taken at far-field distances from the source elements and rely on a number of input parameters, such as positions of the source elements, pressures, and water temperature. Predominant errors in source wavefield modeling are typically related to the accuracy of the calibration and the assumptions made in modeling. As a result, those working in the petroleum industry continue to seek systems and methods to more accurately characterize the source pressure wavefield.

DESCRIPTION OF THE DRAWINGS

FIGS. 4A-4B show isometric and side elevation views, respectively, of an example acoustic source.
FIG. 4C show a plot of a hypothetical near-field signature associated with a gun in a gun array.
FIG. 5A shows an example plot of hypothetical, far-field gun signatures.
FIG. 5B shows an example plot of hypothetical resulting far-field signature associated with a seismic source.

DETAILED DESCRIPTION

Methods and systems for computing notional source signatures from modeled notional signatures and measured near-field signatures are described. Modeled near-field signatures are calculated from the modeled notional signatures. Weights as a function of frequency are determined from comparisons between the modeled near-field signatures and the measured near-field signatures in the frequency domain. Low weights are assigned to parts of the source pressure wavefield spectrum where the signatures are less reliable and higher weights are assigned to parts of the source pressure wavefield spectrum where the signatures are more reliable. The part of the spectrum where both sets of signatures are reliable can be used for quality control and for comparing the measured near-field signatures to modeled near-field signatures. When there are uncertainties in the sensitivity of the near-field hydrophones, the modeling can verify and determine the sensitivities of near-field hydrophones. When there are uncertainties in the input parameters to the modeling, the input parameters can be scaled to minimize the differences between measured and modeled near-field signatures. Resultant near-field signatures are computed by a weighted summation of the modeled and measured near-field signatures and notional signatures are calculated from the resultant near-field signatures.

The following discussion includes two subsections: an overview of exploration seismology; and a description of a method for computing notional source signatures from near-field measurements and modeled notional signatures as an example of computational processing methods and systems to which the current disclosure is directed. Reading of the first subsection can be omitted by those familiar with exploration seismology.

An Overview of Exploration Seismology

Figure 1:
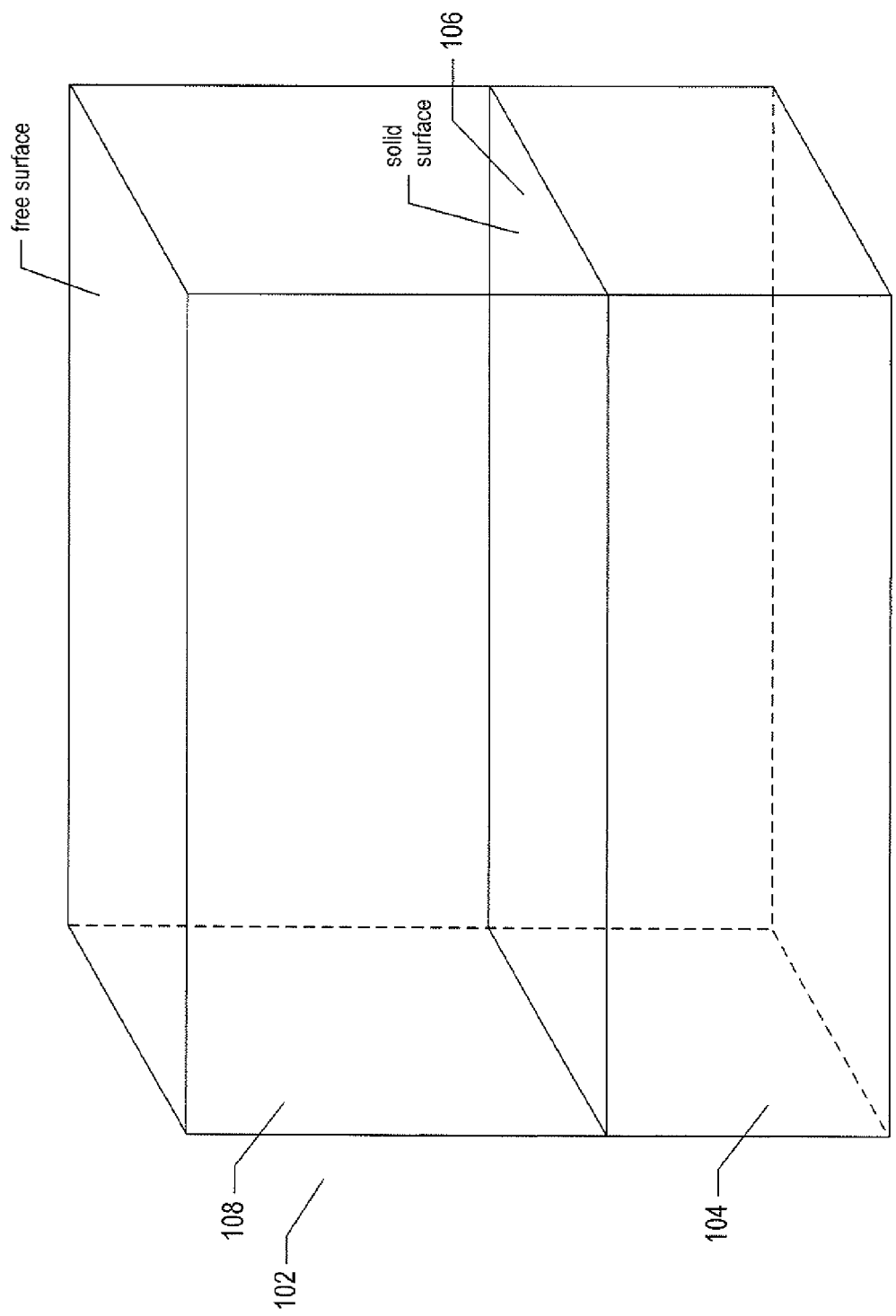
FIG. 1 shows a domain volume of the earth's surface.

FIG. 1 shows a domain volume of the earth's surface. The domain volume 102 comprises a solid volume of sediment and rock 104 below the solid surface 106 of the earth that, in turn, underlies a fluid volume of water 108 within an ocean, an inlet or bay, or a large freshwater lake. The domain volume shown in FIG. 1 represents an example experimental domain for a class of exploration-seismology observational and analytical techniques and systems referred to as "marine exploration seismology."

Figure 2:
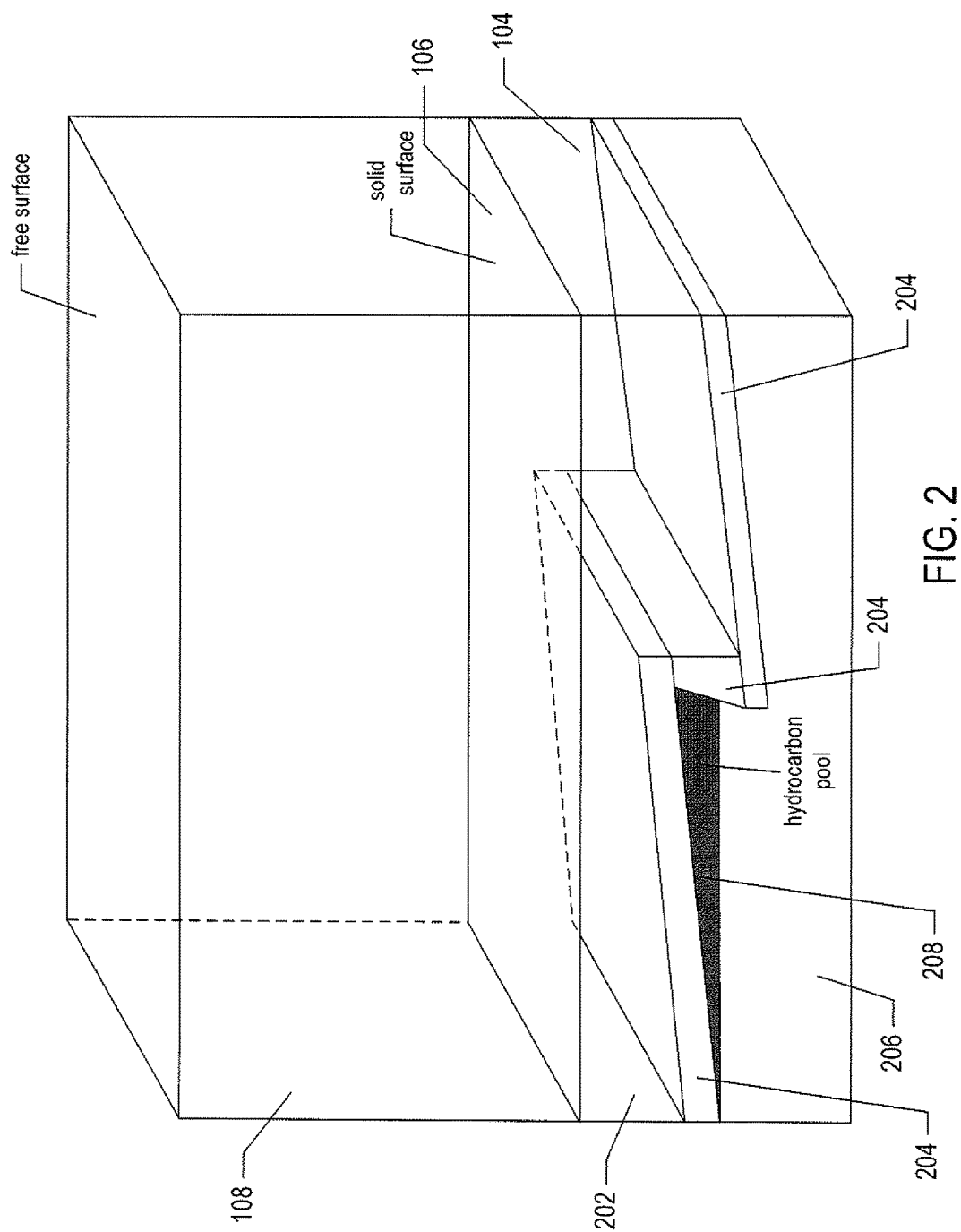
FIG. 2 shows subsurface features of a subterranean formation in the lower portion of the domain volume shown in FIG. 1.

FIG. 2 shows subsurface features of a subterranean formation in the lower portion of the domain volume shown in FIG. 1. As shown in FIG. 2, for exploration-seismology purposes, the fluid volume 108 is a relatively featureless, generally homogeneous volume overlying the solid volume 104 of interest. However, while the fluid volume 108 can be explored, analyzed, and characterized with relative precision using many different types of methods and probes, including remote-sensing submersibles, sonar, and other such devices and methods, the volume of solid crust 104 underlying the fluid volume is comparatively far more difficult to probe and characterize. Unlike the overlying fluid volume 108, the solid volume 104 is significantly heterogeneous and anisotropic, and includes many different types of features and materials of interest to exploration seismologists. For example, as shown in FIG. 2, the solid volume 104 may include a first sediment layer 202, a first fractured and uplifted rock layer 204, and a second, underlying rock layer 206 below the first rock layer. In certain cases, the second rock layer 206 may be porous and contain a significant concentration of liquid hydrocarbon 208 that is less dense than the second-rock-layer material and that therefore rises upward within the second rock layer 206. In the case shown in FIG. 2, the first rock layer 204 is not porous, and therefore forms a lid that prevents further upward migration of the liquid hydrocarbon, which therefore pools in a hydrocarbon-saturated layer 208 below the first rock layer 204. One goal of exploration seismology is to identify the locations of hydrocarbon-saturated porous strata within volumes of the earth's crust underlying the solid surface of the earth.

Figure 3A:
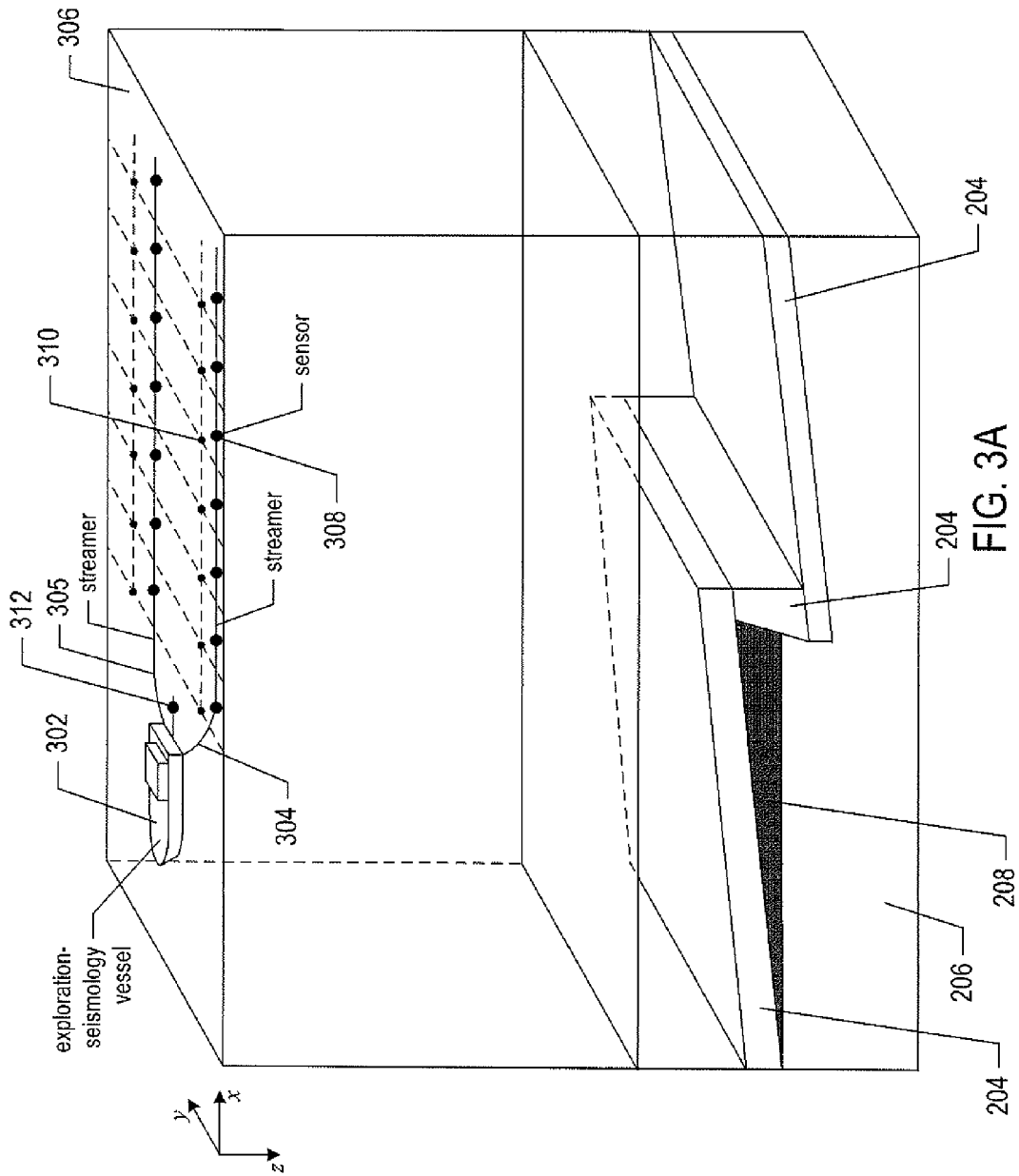
FIGS. 3A-3C show an exploration-seismology method by which digitally encoded data is instrumentally acquired for subsequent exploration-seismology processing and analysis in order to characterize the structures and distributions of features and materials underlying the solid surface of the earth.
Figure 3B:
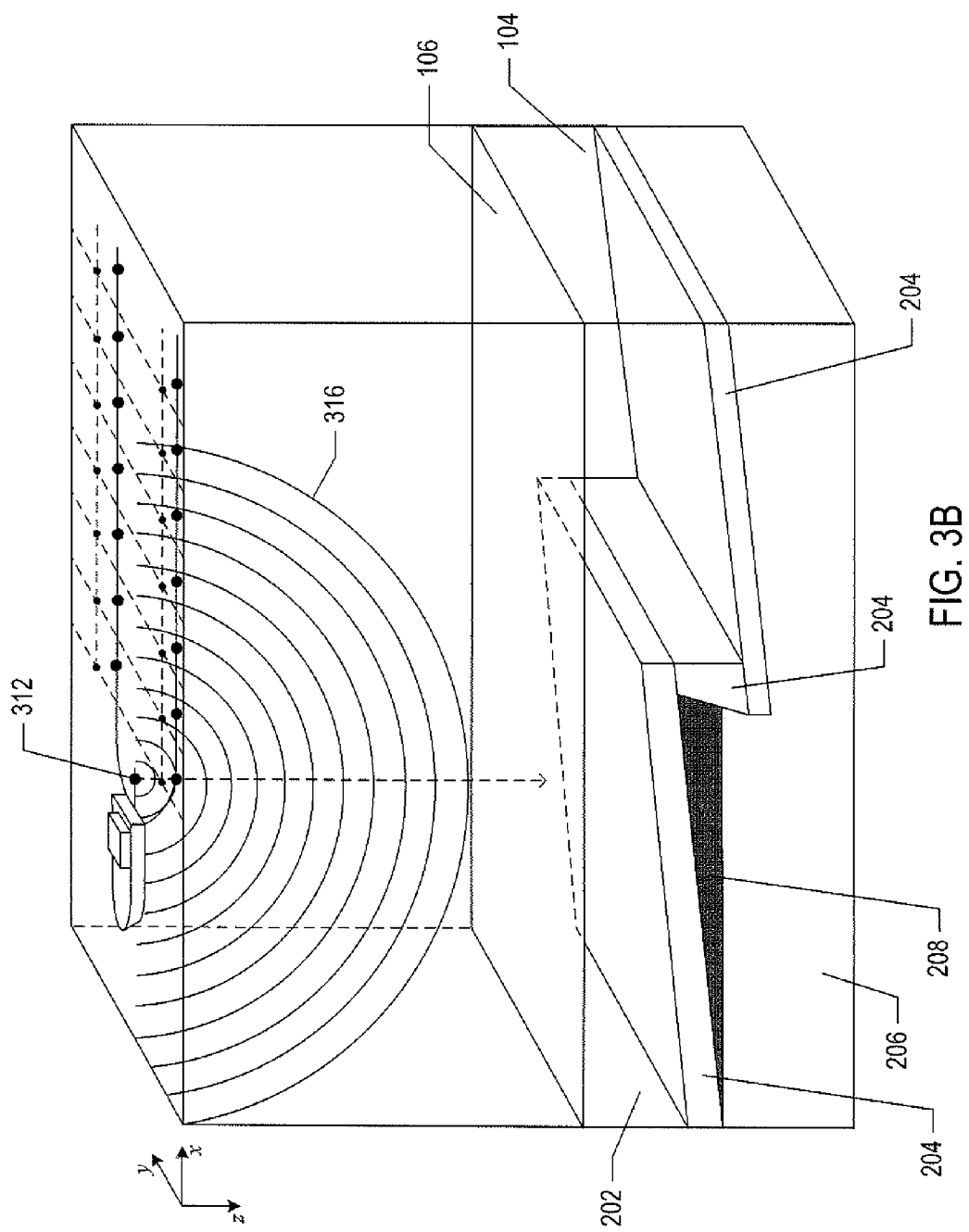
Figure 3C:
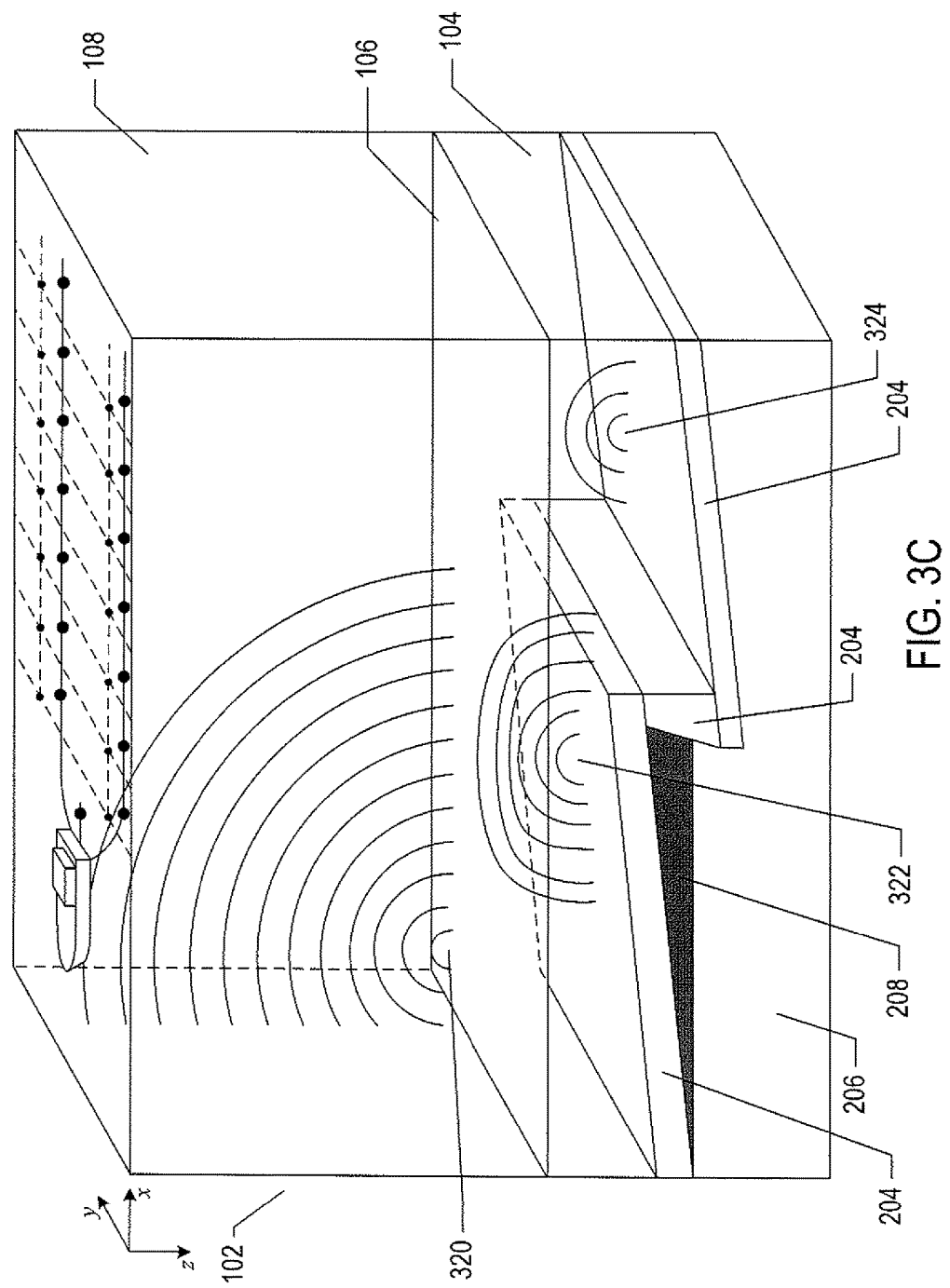

FIGS. 3A-3C show an exploration-seismology method by which digitally encoded data is instrumentally acquired for subsequent exploration-seismology processing and analysis in order to characterize the structures and distributions of features and materials of a subterranean formation. FIG. 3A shows an example of an exploration-seismology vessel 302 equipped to carry out a continuous series of exploration-seismology experiments and data collections. In particular, the vessel 302 tows one or more streamers 304-305 across an approximately constant-depth plane generally located a number of meters below the free surface 306. The streamers 304-305 are long cables containing power and data-transmission lines to which receivers, also referred to as "sensors," are connected at regular intervals. In one type of exploration seismology, each receiver, such as the receiver represented by the shaded disk 308 in FIG. 3A, comprises a pair of seismic receivers including a geophone that detects vertical displacement within the fluid medium over time by detecting particle motion, velocities or accelerations, and a hydrophone that detects variations in pressure over time. The streamers 304-305 and the vessel 302 include sophisticated sensing electronics and data-processing facilities that allow receiver readings to be correlated with absolute positions on the free surface and absolute three-dimensional positions with respect to an arbitrary three-dimensional coordinate system. In FIG. 3A, the receivers along the streamers are shown to lie below the free surface 306, with the receiver positions correlated with overlying surface positions, such as a surface position 310 correlated with the position of receiver 308. The vessel 302 also tows one or more acoustic-wave sources 312 that produce pressure impulses at spatial and temporal intervals as the vessel 302 and towed streamers 304-305 move across the free surface 306.

FIG. 3B shows an expanding, spherical acoustic wavefront, represented by semicircles of increasing radius centered at the acoustic source 312, such as semicircle 316, following an acoustic pulse emitted by the acoustic source 312. The wavefronts are, in effect, shown in vertical plane cross section in FIG. 3B. As shown in FIG. 3C, the outward and downward expanding acoustic wavefield, shown in FIG. 3B, eventually reaches the solid surface 106, at which point the outward and downward expanding acoustic waves partially reflect from the solid surface and partially refract downward into the solid volume, becoming elastic waves within the solid volume. In other words, in the fluid volume, the waves are compressional pressure waves, or P-waves, the propagation of which can be modeled by the acoustic-wave equation while, in a solid volume, the waves include both P-waves and transverse waves, or S-waves, the propagation of which can be modeled by the elastic-wave equation. Within the solid volume, at each interface between different types of materials or at discontinuities in density or in one or more of various other physical characteristics or parameters, downward propagating waves are partially reflected and partially refracted, as at solid surface 106. As a result, each point of the solid surface and within the underlying solid volume 104 becomes a potential secondary point source from which acoustic and elastic waves, respectively, may emanate upward toward receivers in response to the pressure impulse emitted by the acoustic source 312 and downward-propagating elastic waves generated from the pressure impulse.

As shown in FIG. 3C, secondary waves of significant amplitude are generally emitted from points on or close to the solid surface 106, such as point 320, and from points on or very close to a discontinuity in the solid volume 104, such as points 322 and 324. Tertiary waves may be emitted from the free surface 306 back towards the solid surface 106 in response to secondary waves emitted from the solid surface and subsurface features.

FIG. 3C also shows the fact that secondary waves are generally emitted at different times within a range of times following the initial pressure impulse. A point on the solid surface 106, such as point 320, receives a pressure disturbance corresponding to the initial pressure impulse more quickly than a point within the solid volume 104, such as points 322 and 324. Similarly, a point on the solid surface directly underlying the acoustic source receives the pressure impulse sooner than a more distant-lying point on the solid surface. Thus, the times at which secondary and higher-order waves are emitted from various points within the solid volume are related to the distance, in three-dimensional space, of the points from the acoustic source.

Acoustic and elastic waves, however, travel at different velocities within different materials as well as within the same material under different pressures. Therefore, the travel times of the initial pressure impulse and secondary waves emitted in response to the initial pressure impulse are complex functions of distance from the acoustic source as well as the materials and physical characteristics of the materials through which the acoustic wave corresponding to the initial pressure impulse travels. In addition, as shown in FIG. 3C for the secondary wave emitted from point 322, the shapes of the expanding wavefronts may be altered as the wavefronts cross interfaces and as the velocity of sound varies in the media traversed by the wave. The superposition of waves emitted from within the domain volume 102 in response to the initial pressure impulse is a generally very complicated wavefield that includes information about the shapes, sizes, and material characteristics of the domain volume 102, including information about the shapes, sizes, and locations of the various reflecting features within the subterranean formation of interest to exploration seismologists.

The acoustic source 312 can be implemented as an array of seismic source elements, such as air guns and/or water guns, in order to amplify sound waves and overcome undesirable aspects of a signature associated with using a single source element. FIGS. 4A-4B show isometric and side elevation views, respectively, of an example acoustic source 400. The source 400 includes three separate floats 401-403 and three separate corresponding pressure sensing rods 405-407 suspended from the floats 401-403 by a number of ropes or cables, such as cables 408 that suspend the rod 405 below the float 401. In the example of FIGS. 4A-4B, three additional rods 409-411 are suspended below the sensing rods 405-507, respectively, and eleven guns are suspended from each of the additional rods 409-411. For example, pressure sensing rod 405 is suspended between the float 401 and the rod 409 from which the guns, denoted by $G_1$-$G_{11}$, are suspended. Each of the pressure sensing rods 405-411 includes seven pressure sensors that are each positioned to measure the pressure wavefield generated by the one or two guns suspended below the pressure sensor. For example, the pressure sensing rod 405 includes pressure sensors 412-418 located above one or two of the guns $G_1$-$G_{11}$. The pressure sensors can be hydrophones, and the guns can be air guns or water guns. Consider, for example, air guns. Each air gun injects a high pressure bubble of air into the fluid as a source of energy to generate acoustic pressure waves that radiate outward in the fluid and into a subterranean formation. In other words, when a bubble is released from a gun there is a radial displacement of the water from the center of the bubble and a pressure disturbance is propagated outward in the fluid. As the bubble expands, the pressure of the air in the bubble drops until it falls to that of the surrounding fluid, but inertia causes the bubble to over expand so that the air pressure in the bubble is less than the hydrostatic pressure of the surrounding fluid. Then the greatly expanded bubble contracts due to the hydrostatic pressure and the process of expansion and contraction continues with the bubble oscillating through many cycles. As the bubble oscillates and the bubble pressure varies, pressure waves radiate outward into the fluid. The bubble oscillation amplitude decreases with time, and the period of oscillation decreases from one cycle to the next. The pressure variation in the fluid as a function of time caused by the bubble is called the "signature."

Each gun has an associated near-field signature and a far-field signature. "Near field" and "far field" are terms used to describe proximity of an observation point to a gun when the signature is measured. For a gun that releases a pressure wave with a wavelength $\lambda=c/f$, where c is the speed of sound in the fluid, and f is the frequency, the near-field and far-field radial regions surrounding the gun can be defined as:

Near field: $d<\lambda$

Intermediate field: $d\sim\lambda$

Far field: $\lambda<<d$ where d is the distance from the gun to an observation point As shown in FIGS. 4A-4B, the pressure sensors are located in close proximity to the guns. As a result, each pressure sensor measures the near-field signature of each gun or pair of guns suspended below the pressure sensor.

The detailed features of a signature are determined by the subsequent motion of the bubble following its release from a gun. FIG. 4C show a plot of a hypothetical near-field signature associated with a gun in a gun array. Horizontal axis 420 represents time, and vertical axis 422 represents pressure. First peak 424 represents an initial build-up and release of a bubble from the gun into the fluid, after which, subsequent peaks 425-427 represent a decrease in amplitude with increasing time. The near-field signature reveals that the pressure after reaching a peak falls to values below the hydrostatic pressure, $p_h$. The bubble oscillation amplitude decreases as time passes and the bubble period of oscillation is not constant from one cycle to the next. In other words, the bubble motion is not simple harmonic motion. In general, the larger the chamber volume of the gun, the larger the peak amplitudes and the longer the bubble periods. The near-field signature is also influenced by the pressure waves created by other guns in the gun array when the guns are fired simultaneously. In other words, when the guns of the gun array are fired simultaneously, the hydrostatic pressure around each bubble is no longer constant. Pressure waves radiating from other bubbles from many different directions impinge on each bubble, modifying the behavior of the bubble and the associated near-field signature.

The guns of a gun array are selected with different chamber volumes and arranged in a particular manner in order to generate a resulting far-field seismic wave with a short and narrow signature in the vertical-downward direction and with a spectrum that is smooth and broad over a frequency band of interest. FIG. 5A shows an example plot of hypothetical, far-field gun signatures associated with the eleven guns $G_1$-$G_{11}$ shown in FIG. 5. Horizontal axis 502 represents time, vertical axis 504 represents pressure, and diagonal axis 506 represents the indices of the guns $G_1$-$G_{11}$. Each far-field signature includes a first large positive peak following in time by a second large negative peak, which is followed by a series of lower amplitude non-periodic damped bubble oscillations. For example, the far-field signature associated with gun $G_1$ has a first large positive peak 508, a second large negative peak 509 and a series of non-periodic oscillations 510 associated with damped oscillations of a bubble released from the gun $G_1$ as measured by a pressure sensor in the far field. The first large positive peak of each far-field signature is the initial pressure release of the bubble from the gun in the far field and is called the "primary peak." The second large negative peak of each far-field signature represents the initial pressure release reflected from the free surface and is called the "source ghost." The guns $G_1$-$G_{11}$ are selected with different air chamber volumes to produce different damped bubble oscillations following the primary peaks. FIG. 5A represents the far-field signatures associated with the guns $G_1$-$G_{11}$ when the guns are fire simultaneously. As a result, each far-field signature has a primary peak at approximately the same point in time. The far-field signatures associated with each of the individual guns of a gun array do not combine according to the principle of superposition. If interactions between pressure waves generated by the guns in a gun array were negligible or nonexistent, the far-field signatures could be combined according the principle of superposition to calculate a resultant far-field signature of the gun array. However, as explained above, interactions between the pressure waves created by the guns are not negligible, especially at low frequencies. Instead, the guns $G_1$-$G_{11}$ are selected with different chamber volumes, gun spacing, and gun positions within the gun array in order to amplify the primary peaks and cancel the damped bubble oscillations to produce a hypothetical resulting far-field source signature 512 of the guns $G_1$-$G_{11}$ plotted in FIG. 5B. The resulting far-field source signature 512 has an amplified primary 514 followed in time by very small amplitude oscillations.

Note that acoustic sources are not intended to be limited to the example thirty-three gun array 510 shown in FIG. 5A. In practice, acoustic sources can be configured with one or more floats and each float can have any number of guns suspended from the float. The guns can be arranged and selected with chamber volumes to produce a resulting far-field source signature that substantially matches the example resulting far-field source signature shown in FIG. 5B.

Figure 6:
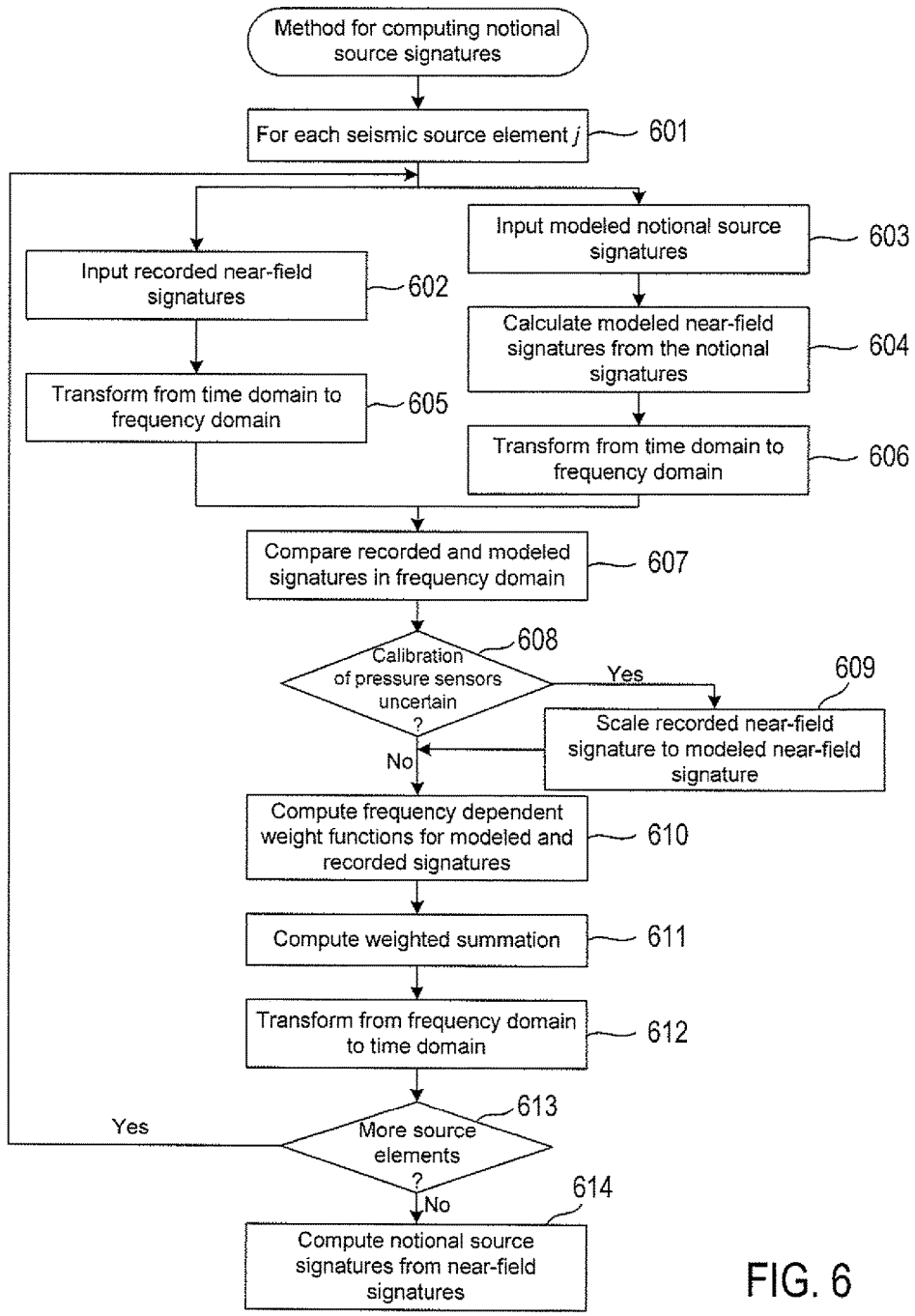
FIG. 6 shows a control-flow diagram of a method for computing notional signatures from near-field measurements and modeled notional signatures.

A Method for Computing Notional Source Signatures from Near-Field Measurements and Modeled Notional Signatures as an Example of Computational Processing Methods and Systems to which the Current Application is Directed Methods and systems for computing notional signatures from near-field measurements and modeled notional signatures are now described. FIG. 6 shows a control-flow diagram of a method for computing notional signatures from near-field measurements and modeled notional signatures. In the for-loop beginning with block 601, the operations associated with blocks 602-613 are repeated for each source element of an acoustic source. In FIG. 6, blocks 602 and 605 are presented in parallel with blocks 603, 604 and 606. In practice, the computation processes associated with blocks 602 and 605 can be executed before the computational processes of blocks 603, 604, and 606. Alternatively, the computational processes associated with blocks 603, 604, and 606 can be executed before the computational processes associated with blocks 602 and 605. Alternatively, the computational processes associated with blocks 603, 604, and 606 can be executed in parallel with the computational processes associated with blocks 602 and 605.

In block 602, a recorded near-field signatures, $p_j^{rec}(t)$, obtained from a pressure measurement at the jth pressure sensor is input, where t represents time. In block 603, modeled notional source signatures, $p'_i(t)$, associated with each source element of the acoustic source are input. A "notional" source signature is an isolated near-field signature of the pressure wavefield near the i-th source element with pressure wavefields created by other neighboring source elements removed and reflections from the free surface removed. The distances and locations of the pressure sensors and source elements of the acoustic source are known and can be used to calculate the modeled notional source signatures $p'_i(t)$ associated with each of the source elements using a seismic analysis and data processing techniques, such as those techniques provided in Nucleus+(see e.g. http://www.pgs.com/pageFolders/308427/NucleusplusBrochureOctober2010.pdf) and described in "The growth or collapse of a spherical bubble in a viscous compressible liquid," by F. R. Gilmore, *Office of Naval Research*, Report No. 26-4, Apr. 1, 1952. In block 604, a modeled near-field signature associated with the jth source element is calculated from the modeled notional source signatures $p'_i(t)$ as follows:

$$p_j^{mod}(t) = \sum_{i=1}^{n} \frac{1}{r_{ij}} p'_i\left(t - \frac{r_{ij}}{c}\right) + R \sum_{i=1}^{n} \frac{1}{r'_{ij}} p'_i\left(t - \frac{r'_{ij}}{c}\right) \quad (1)$$

where $r_{ij}$ is the distance from the ith source element to the jth pressure sensor or near-field measurement position;

$r'_{ij}$ is the total distance along a ray path from the ith source element up to the free surface and down to the jth pressure sensor or near-field measurement position;

R is the reflection coefficient of the free surface;

c is the propagation velocity of pressure waves in the fluid; and n is the number of near-field pressure sensors and the number source elements.

Figure 7:
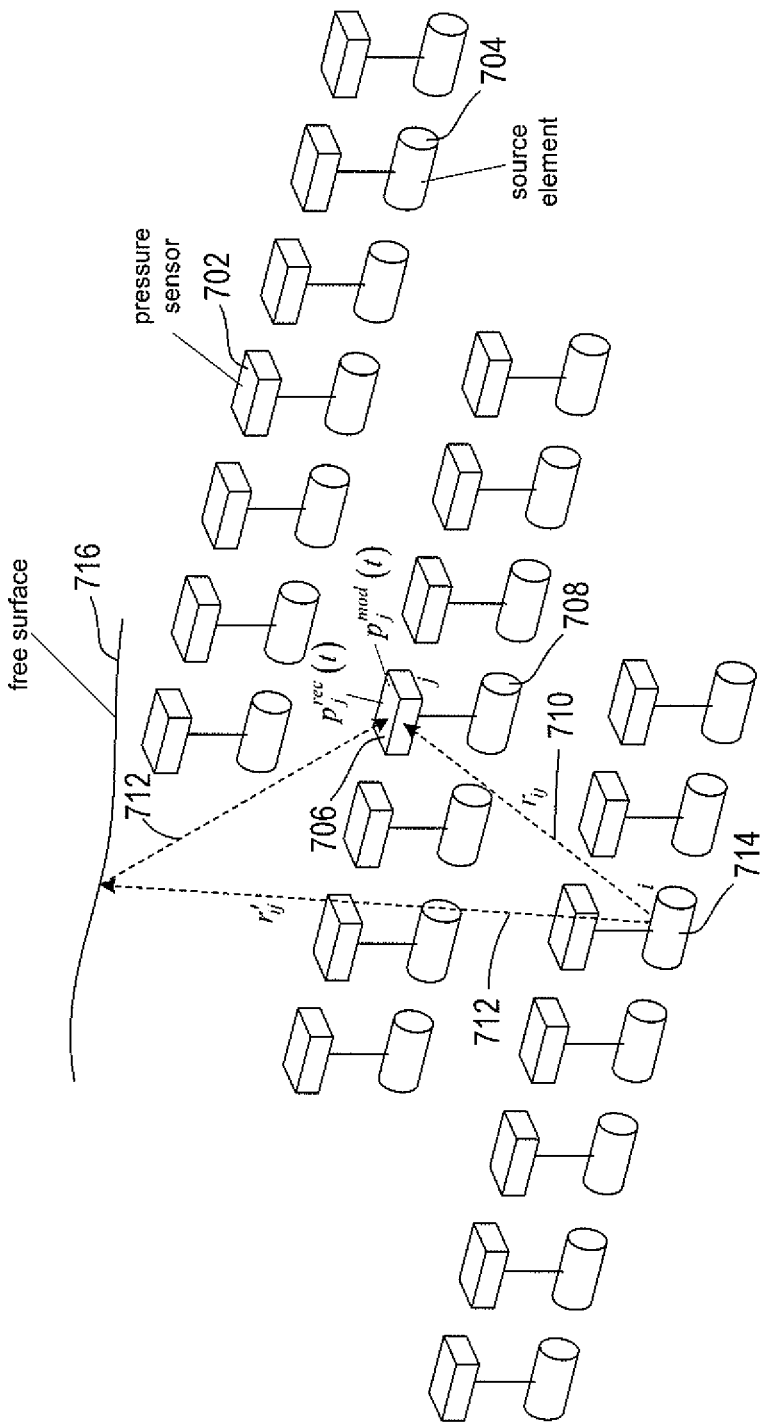
FIG. 7 shows an isometric view of a subset of pressure sensors and associated source elements of an acoustic source.

FIG. 7 shows an isometric view of a subset of pressure sensors and associated source elements of an acoustic source composed of n pressure sensors and n source elements. In the example of FIG. 7, rectangular prisms, such as prism 702, represent pressure sensors and cylinders, such as cylinder 704, represent source elements. As shown in FIG. 7, and described above with reference to FIG. 4, each source element has an associated pressure sensor and each pressure sensor is located within the near field of the source element to measure the near-field signature of an associated source element. For example, as shown in FIG. 7, jth pressure sensor 706 measures the time varying, pressure wavefield to produce the recorded near-field signature $p_j^{rec}(t)$ associated with the jth source element 708. FIG. 7 also shows the parameters used in Equation (1) to compute the time varying, modeled near-field signature $p_j^{mod}(t)$ from the modeled notional signatures $p'_i(t)$. Dashed directional arrow 710 represents the distance $r_{ij}$ from the ith source element 714 to the jth pressure sensor 706, and directional arrows 711 and 712 represent the total distance $r'_{ij}^{rec}$ from the ith source element 714 up to free surface 716 and down to the jth pressure sensor 706.

Figure 8:
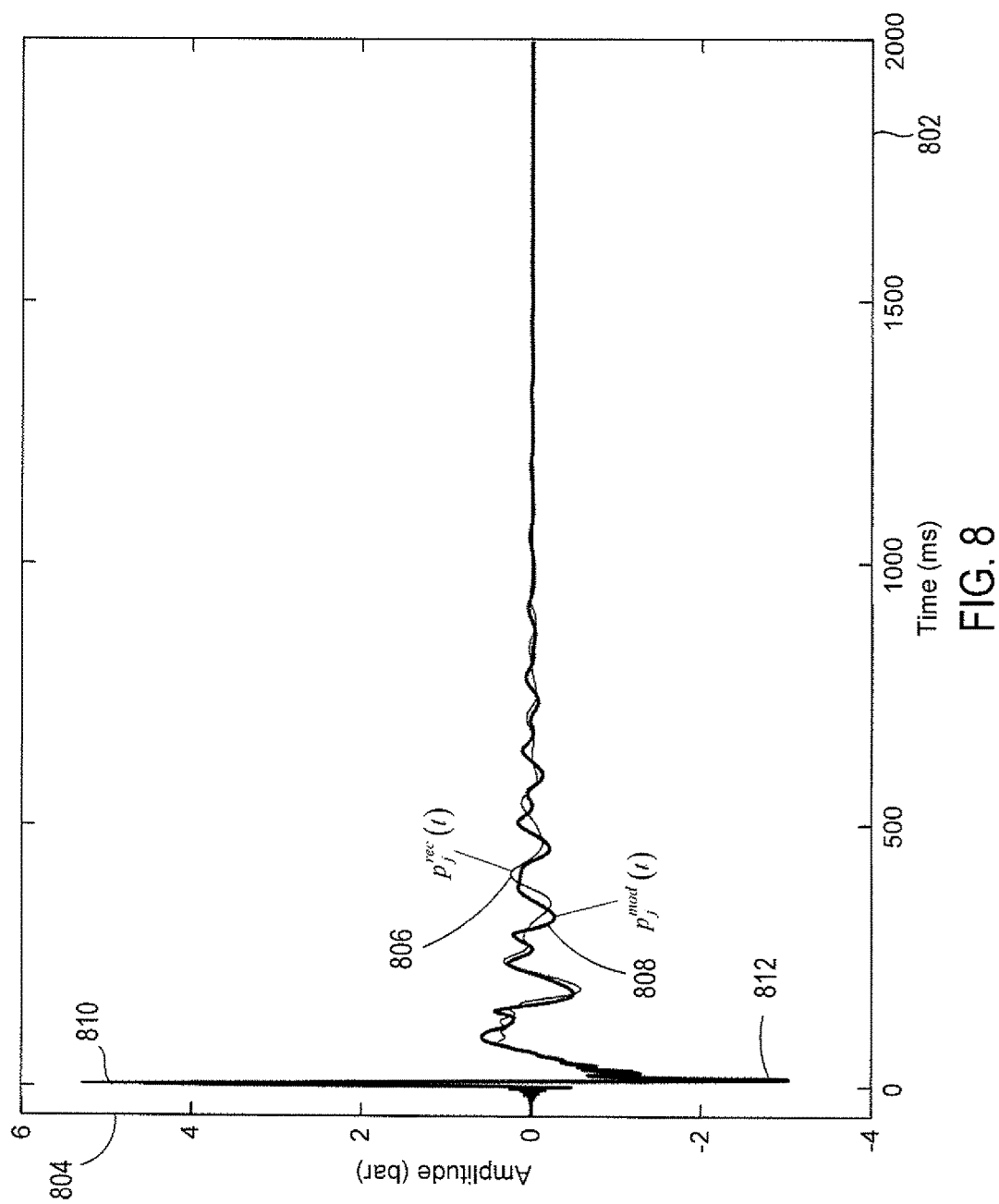
FIG. 8 shows a plot of a recorded near-field signature and a modeled near-field signature in the time domain.

FIG. 8 shows a plot of an actual recorded near-field signature $p_j^{rec}(t)$ and an actual modeled near-field signature $p_j^{mod}(t)$ in the time domain. In FIG. 8, horizontal axis 802 represents time and vertical axis 804 represents pressure. Narrow curve 806 represents a time varying recorded near-field signature $p_j^{rec}(t)$ and thick curve 808 represents a time varying modeled near-field signature $p_j^{mod}(t)$ for the jth source element of an acoustic source. Sharp positive peak 810 represents the initial pressure release of the bubble from a gun and the second negative peak 812 represents the "source ghost." As shown in FIG. 8, the modeled near-field signature substantially matches the overall shape of the recorded near-field signature, but close inspection of the curves 806 and 808 reveal that the modeled near-field signature does not match time variations of the recorded near-field signature.

Returning to FIG. 6, in block 605, the recorded near-field signature $p_j^{rec}(t)$ is transformed from the time domain to the frequency domain, and in block 606, the modeled near-field signature $p_j^{mod}(t)$ is transformed from the time domain to the frequency domain. For example, the recorded near-field signature can be transformed using a discrete Fourier transform given by:

$$p_j^{rec}(\omega_\beta) = \sum_{\alpha=0}^{N-1} p_j^{rec}(t_\alpha)e^{-i\omega_\beta t_\alpha} \quad (2)$$

where $\beta = 0, 1, 2, \ldots, N-1$;

N is the number of time samples;

$\omega_\beta$ is the $\beta$th angular frequency sample; and $t_\alpha$ is the sample time.

And the modeled near-field signature can be transformed using a discrete Fourier transform given by:

$$p_j^{mod}(\omega_\beta) = \sum_{\alpha=0}^{N-1} p_j^{mod}(t_\alpha)e^{-i\omega_\beta t_\alpha} \quad (3)$$

In practice, the recorded near-field signature and the modeled near-field signature can be transformed using a fast Fourier transform for computation efficiency.

Figure 9:
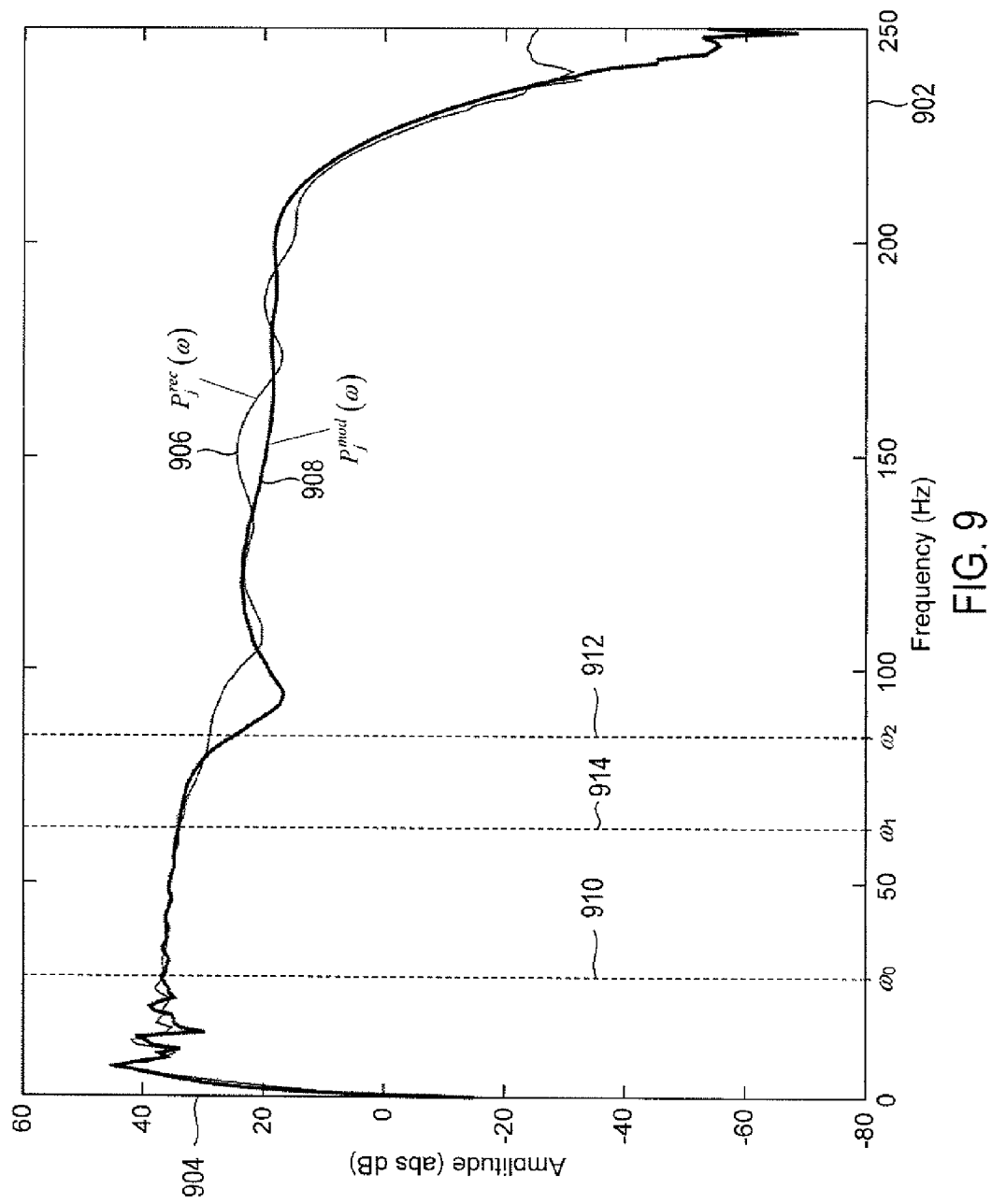
FIG. 9 shows a plot of a recorded near-field signature and a modeled near-field signature in the frequency domain.

FIG. 9 shows a plot of a frequency spectrum composed of the recorded near-field signature $p_j^{rec}(\omega)$ and the modeled near-field signature $p_j^{mod}(\omega)$ in the frequency domain. Horizontal axis 902 represents angular frequency and vertical axis 904 represents amplitude in dB. Narrow curve 906 represents the recorded near-field signature $p_j^{rec}(\omega)$ and thick curve 908 represents the modeled near-field signature $p_j^{rec}(\omega)$. Visual inspection of curves 906 and 908 reveals that the recorded near-field signature $p_j^{rec}(\omega)$ and the modeled near-field signature $p_j^{mod}(\omega)$ have similar overall shapes over the entire frequency range represented in FIG. 9 but do not match with respect to smaller variations in amplitude. In practice, the recorded near-field signature $p_j^{rec}(\omega)$ provides a better characterization of a true near-field signature than the modeled near-field signature $p_j^{mod}(\omega)$ for low frequencies (i.e., for frequencies less than $\omega_1$ 910), and the modeled near-field signature $p_j^{mod}(\omega)$ provides a better characterization of the true near-field signature than the recorded near-field signature $p_j^{rec}(\omega)$ for high frequencies (i.e., for frequencies greater than $\omega_2$ 912). The predominant errors in the recorded near-field signature $p_j^{rec}(\omega)$ are typically due to high frequency noise caused by cross talk and from the motion caused by firing powerful, nearby source elements, while the modeled near-field signature relies on careful calibration with actual measurements taken at larger distances from the source elements that are not contaminated with the same noise as the near field measurements. In addition, modeling uses a number of input parameters such as position of the source elements, pressures, and water temperature. On the other hand, the predominant errors in the modeled near-field signature $p_j^{mod}(\omega)$ are typically due to pulses, such as bubble pulses created by air guns, but because the pulses occur at low frequencies, the uncertainty in the modeled near-field signature is larger at lower frequencies. As a result, the recorded near-field signature $p_j^{rec}(\omega)$ is most reliable for frequencies less than $\omega_1$ but cannot be relied upon to characterize the near-field signature for the entire frequency range, and the modeled near-field signature $p_j^{mod}(\omega)$ is most reliable for frequencies greater than $\omega_2$ but cannot be relied upon to characterize the near-field signature for the entire frequency range. In the frequency range between $\omega_1$ and $\omega_2$, dashed lines 914 and 912 mark boundaries of a transition region over which the recorded near-field signature $p_j^{rec}(\omega)$ becomes less reliable and the modeled near-field signature $p_j^{mod}(\omega)$ becomes more reliable for characterizing the near-field signature. As shown in FIG. 9, the recorded and modeled near-field signatures are in good agreement between $\omega_0$ and $\omega_1$ 914. The spectrum is slightly affected by a bubbe pulse for frequencies greater than $\omega_0$ and is less complex for frequencies less than $\omega_0$. As a result, either near-field signature between $\omega_0$ and $\omega_1$ can be used to calibrate the other near-field signature. For example, between $\omega_0$ and $\omega_1$, the measured near-field signatures can be used to calibrate the modeled near-field signatures or the modeled near-field signatures can be used to calibrate the measured near-field signatures Returning to FIG. 6, the method in blocks 607-612 combines the most reliable parts of the recorded near-field signature with the most reliable parts of the modeled near-field signature to compute a reliable near-field signature for the jth source element over the entire frequency domain. In particular, the method combines the low frequency part of the recorded near-field signature with the high frequency part of the modeled near-field signature to produce a near-field signature associated with the jth source element over the frequency domain given by:

$$P_j(\omega) = W(\omega)s_j P_j^{rec}(\omega) + [1-W(\omega)]P_j^{mod}(\omega) \quad (4)$$

where $s_j$ is a scale factor computed below in block 609; and $W(\omega)$ is a weight function to transition from the recorded near-field signature $p_j^{rec}(\omega)$ to the modeled near-field signature $p_j^{mod}(\omega)$ as a function of the frequency $\omega$. The weight function $W(\omega)$ has the properties given by:

$W(\omega) = 1$ for $0 < \omega \leq \omega_1$.

$0 < W(\omega) < 1$ for $\omega_1 < \omega < \omega_2$ $W(\omega) = 0$ for $\omega_2 \leq \omega$ An example of a suitable weight function is described below with reference to block 610. In block 607, rather than using visual inspection to compare the recorded near-field signature to the modeled near-field signature, as described above with reference to FIG. 9, spectral coherence can be used to compare the recorded near-field signature and the modeled near-field signature in the frequency domain. Spectral coherence can be computed using $$C_{rm} = \frac{(P_{rm})^2}{P_{rr}P_{mm}} \quad (5)$$

where $$P_{rr} = p_j^{rec}(\omega)\overline{p_j^{rec}(\omega)} \quad (5a)$$

$$P_{mm} = p_j^{mod}(\omega)p_j^{mod}(\omega) \quad (5b)$$

$$P_{rm} = p_j^{rec}(\omega)\overline{p_j^{mod}(\omega)} \quad (5c)$$

The spectral coherence $C_{rm}$ is a fractional value that ranges between "0" and "1" and can be used as a metric to determine the degree to which the recorded and modeled near-field signatures are correlated, with "0" indicating no correlation and "1" indicated a strong correlation.

Figure 10:
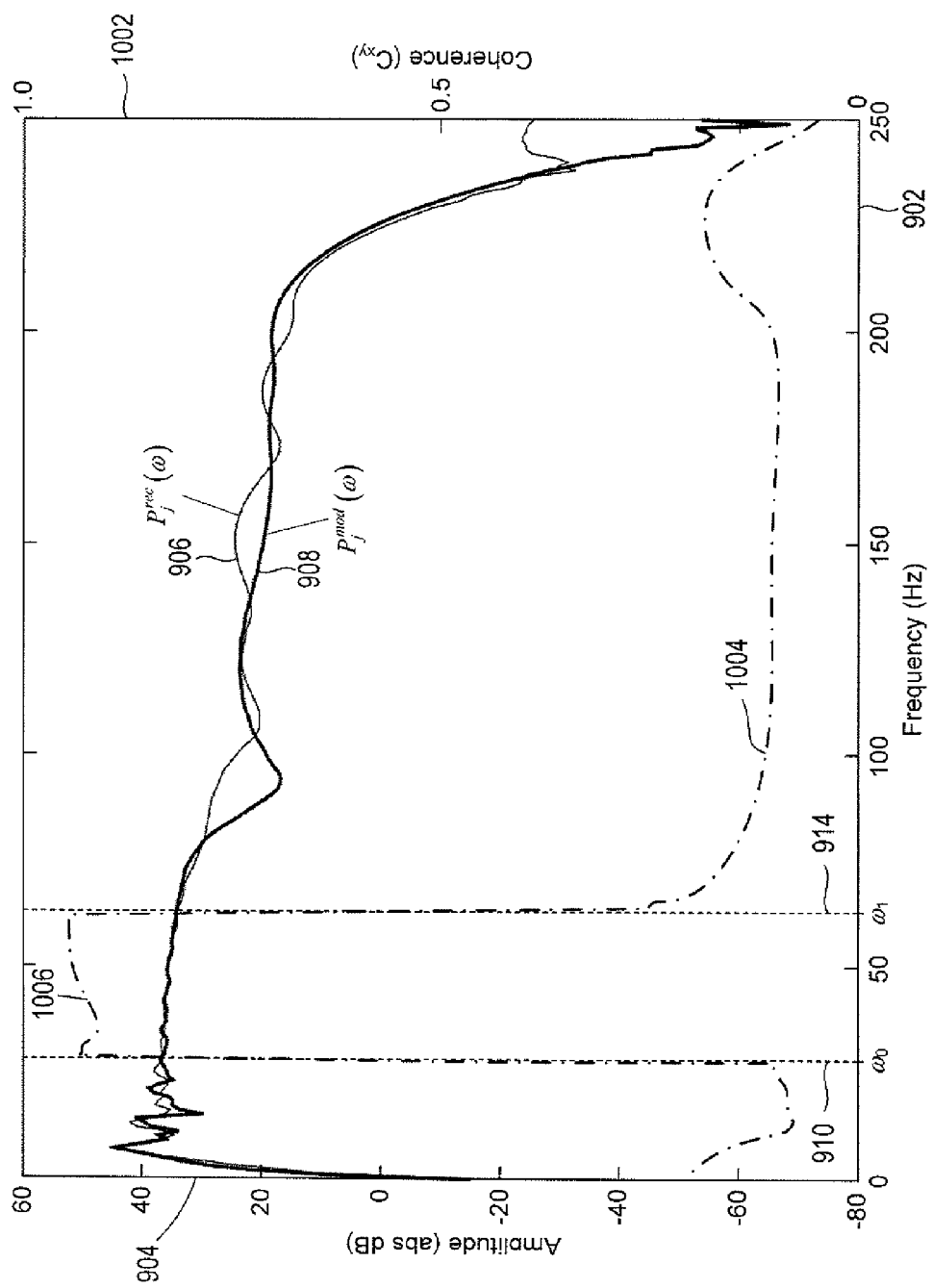
FIG. 10 shows a plot of the recorded near-field signature and the modeled near-field signature shown in FIG. 9 and a hypothetical representation of a spectral coherence curve.

FIG. 10 shows a plot of the frequency spectrum shown in FIG. 9, and a hypothetical representation of a spectral coherence. In FIG. 10, vertical axis 1002 represents the spectral coherence axis and dash-dot line 1004 represents the spectral coherence over the range of frequencies. Within the frequency range between $\omega_0$ to $\omega_1$, as defined by dashed lines 910 and 914, respectively, the spectral coherence is largest 1006, which indicates the recorded near-field signature $p_j^{rec}(\omega)$ and the modeled near-field signature $p_j^{mod}(\omega)$ are in agreement over the frequency range between $\omega_0$ to $\omega_1$. However, outside the range from $\omega_0$ to $\omega_1$ the spectral coherence is lower, which is consistent with the recorded near-field signature $p_j^{rec}(\omega)$ providing a better characterization of the true near-field signature than the modeled near-field signature $p_j^{mod}(\omega)$ over the low frequency range and the modeled near-field signature $p_j^{mod}(\omega)$ providing a better characterization of the true near-field signature than the recorded near-field signature $p_j^{rec}(\omega)$ over the high frequency range.

Returning to FIG. 6, in decision block 608, when calibration of the pressure sensors is uncertain, the method proceeds to block 609. Otherwise, the method proceeds to block 610. In block 609, the recorded near-field signatures are scaled to the modeled near-field signatures using the portion of the spectrum with the highest spectral coherence. For example, the recorded near-field signature can be scaled to the modeled near-field signature by computing a scale factor given by:

$$s_j = \frac{P_j^{mod}(\omega)}{P_j^{rec}(\omega)} \quad (6)$$

where $\omega_0 < \omega < \omega_1$ is the frequency range over which the recorded near-field signature $p_j^{rec}(\omega)$ and the modeled near-field signature $p_j^{mod}(\omega)$ have the highest spectral coherence, as described above with reference to FIG. 10.

When calibration of the pressure sensors is known, the scale factor $s_j$ is used to correct the unit of the measured near-field signature (e.g. mV) to a pressure unit (e.g. Pa). Also, in this case, the measured near-field signatures can be used to calibrate the modeled near-field signatures, unless the measured and modeled near-field signatures are in agreement. In block 610, the weight function for $\omega_1 < \omega < \omega_2$ can be calculated using, for example, the Hanning weight function given by:

$$W(\omega) = \frac{1}{2}[1 + \cos(\pi f(\omega))] \quad (7)$$

where $f(\omega)$ is function.

When the function $f(\omega)$ ranges between "−1" and "0" the weight function $W(\omega)$ ranges between "0" and "1," and when the function $f(\omega)$ ranges between "0" and "1" the weight function $W(\omega)$ ranges between "1" and "0." For example, the function $f(\omega)$ can be a linear function given by:

$$f(\omega) = \frac{\omega - \omega_1}{\omega_2 - \omega_1} \quad (8)$$

where $\omega_1 < \omega < \omega_2$.

Figure 11:
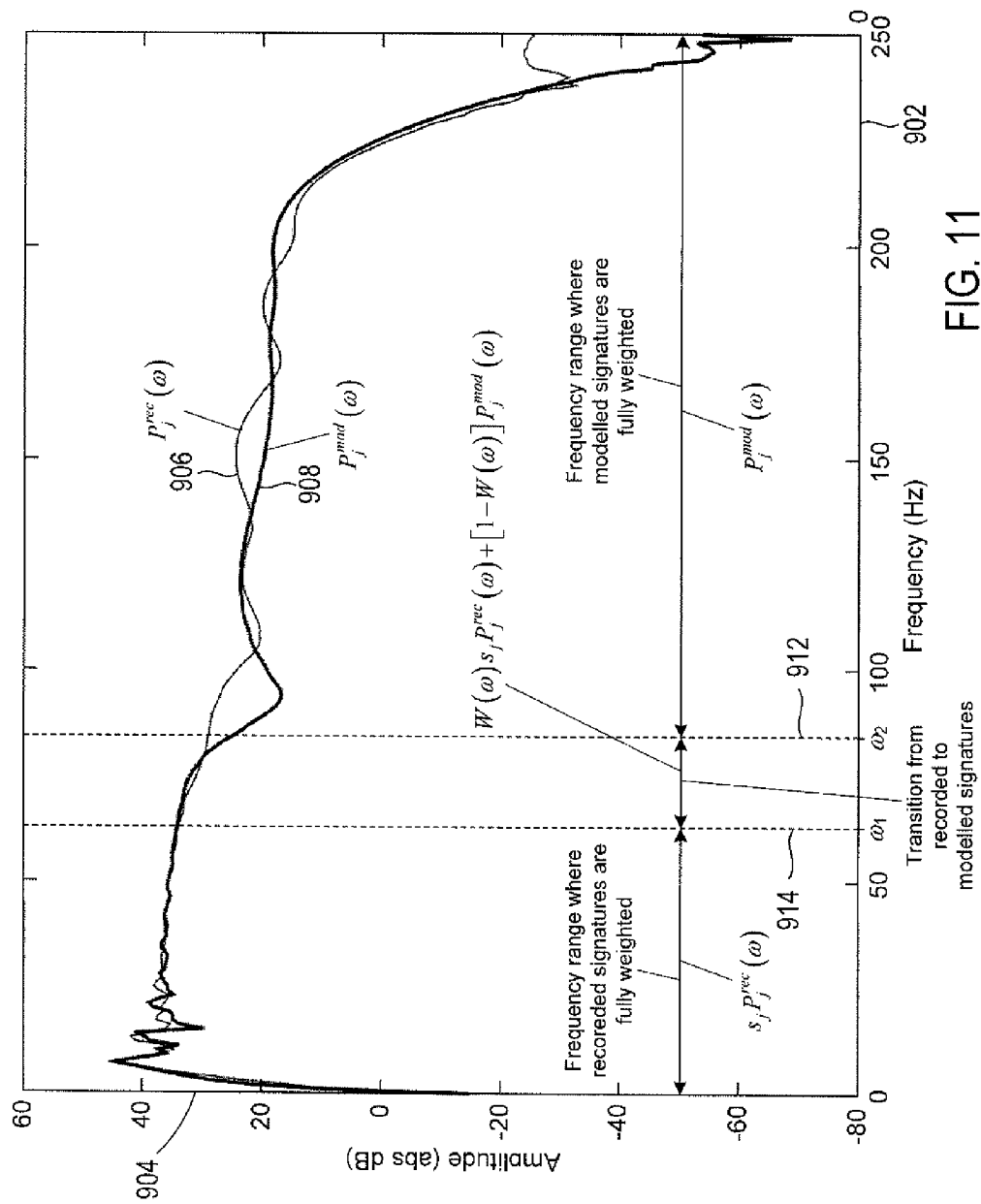
FIG. 11 shows a plot of the recorded near-field signature and the modeled near-field signature shown in FIG. 9 with functions used to compute a near-field signature over separate regions of the frequency domain identified.

In this example, the function ranges from "0" to "1" as the frequency $\omega$ is increased from $\omega_1$ to $\omega_2$. Alternatively, different types of functions $f(\omega)$ and weight functions $W(\omega)$ can be used to control the influence the recorded near-field signature or the modeled near-field signature have over the range of frequencies $\omega_1 < \omega_2$. In block 611, the near-field signature associated with the jth source element is computed according to Equation (4). FIG. 11 shows a plot of the frequency spectrum shown in FIG. 9, with the functions used to compute the near-field signature over separate regions of the frequency domain identified. In block 612, the resultant near-field signature $p_j(\omega)$ given by Equation (4) is transformed from the frequency domain to the time domain using an inverse transformation. For example, the resultant near-field signature $P_j(\omega)$ can be transformed from the frequency domain to the time domain using an inverse Fourier transform to give a resultant near-field signature in the time domain given by:

$$p_j(t_\alpha) = \frac{1}{N} \sum_{\beta=0}^{N-1} p_j(\omega_\beta) e^{i\omega_\beta t_\alpha} \quad (9)$$

where $\alpha = 0, 1, 2, \ldots, N-1$; and $P_j(\omega_\beta)$ is given by Equation (4).

In practice, an inverse fast Fourier transform can be used for computational efficiency. In block 613, when more source elements are available, the operations associated with blocks 602-612 are repeated until a resultant near-field signature $p_j(t)$ has been computed for each of the n source elements. Otherwise, the method proceeds to block 614. In block 614, n notional source signatures are calculated from the near-field signatures $p_j(t)$ by solving a set of n equations with n unknowns given by:

$$p'_j(t) = p_j(t) - \sum_{i=1}^{n(i \neq j)} \frac{1}{r_{ij}} p'_i\left(t - \frac{r_{ij}}{c}\right) - R \sum_{i=1}^{n} \frac{1}{r'_{ij}} p'_i\left(t - \frac{r'_{ij}}{c}\right) \quad (10)$$

where $p_j(t)$ is the resultant near-field signature computed in block 612; and $p'_i(t)$ are n unknown notional source signatures associated with each of the n pressure sensors.

The n notional signatures $p'_i(t)$ can be computed from Equation (10) iteratively in time steps. The secondary contributions from the surrounding source elements and the associated ghosts are subtracted from the near-field signature to derive each notional source signature. At a time t, the notional source signatures from the surrounding guns $p'_i$ at times $$\left(t - \frac{r_{ij}}{c}\right)$$

have already been calculated in an earlier time step, because $$t > \left(t - \frac{r_{ij}}{c}\right),$$

and is already known. This method relies on the number of near-field pressure sensors being the same as the number of source elements.

Figure 12:
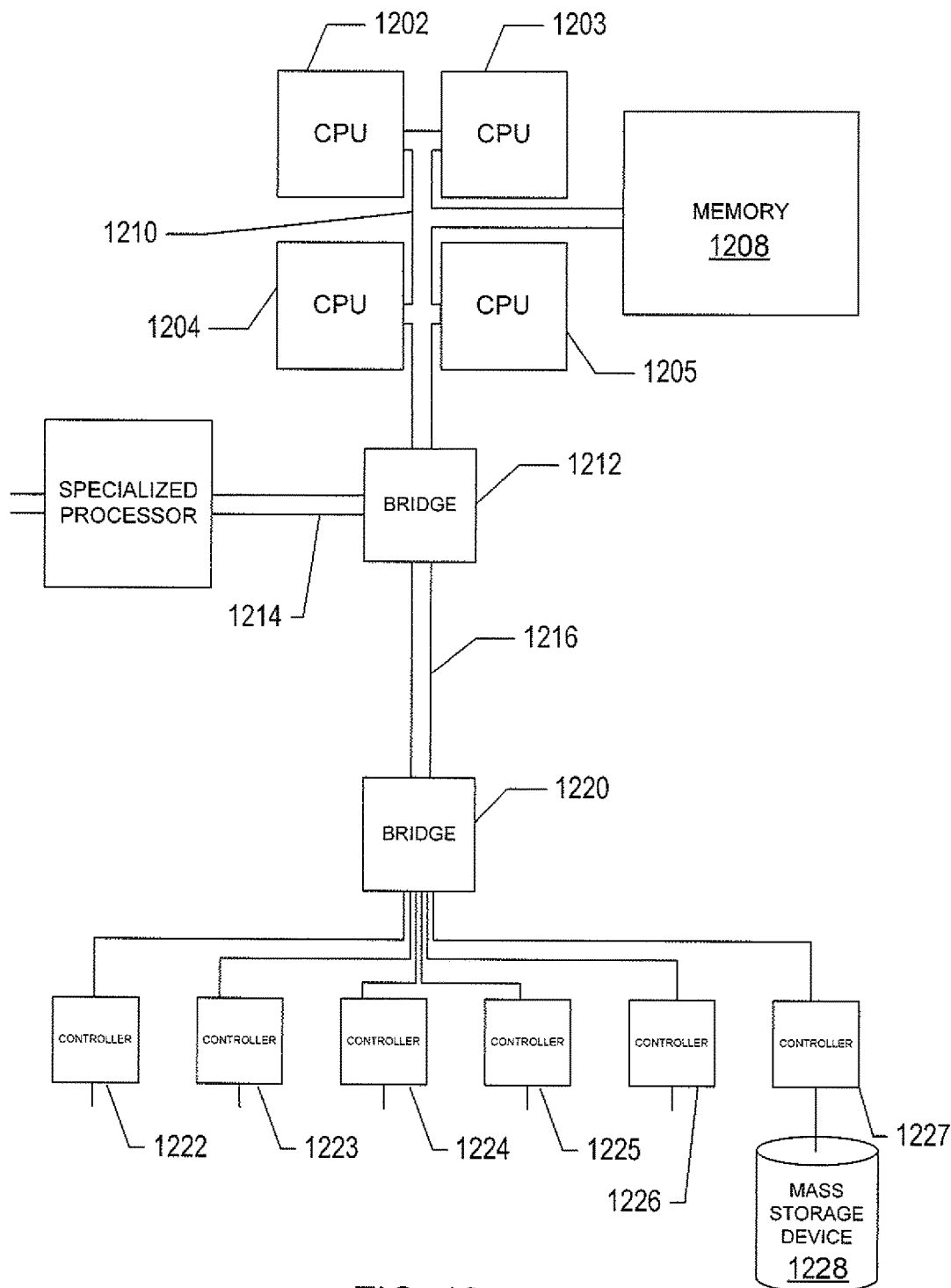
FIG. 12 shows one example of a generalized computer system that executes an efficient method for computing notional source signatures from measured near-field signatures and modeled notional source signatures.

FIG. 12 shows one illustrative example of a generalized computer system that executes an efficient method for computing notional source signatures from measured near-field signatures and modeled notional source signatures and therefore represents a seismic-analysis data-processing system to which the description is directed. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1202-1205, one or more electronic memories 1208 interconnected with the CPUs by a CPU/memory-subsystem bus 1210 or multiple busses, a first bridge 1212 that interconnects the CPU/memory-subsystem bus 1210 with additional busses 1214 and 1216, or other types of high-speed interconnection media, including multiple, high-speed serial interconnects. These busses or serial interconnections, in turn, connect the CPUs and memory with specialized processors, such as a graphics processor 1218, and with one or more additional bridges 1220, which are interconnected with high-speed serial links or with multiple controllers 1222-1227, such as controller 1227, that provide access to various different types of computer-readable media, such as computer-readable medium 1228, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1228 is a data-storage device, including electronic memory, optical or magnetic disk drive, USB drive, flash memory and other such data-storage device. The computer-readable medium 1228 can be used to store machine-readable instructions associated with the computational methods described above and can be used to store encoded data, during store operations, and from which encoded data can be retrieved, during read operations, by computer systems, data-storage systems, and peripheral devices.

Although the present invention has been described in terms of particular embodiments, it is not intended that the invention be limited to these embodiments. Modifications within the spirit of the invention will be apparent to those skilled in the art. For example, any number of different computational-processing-method implementations that carry out efficient computation of notional source signatures using modeled notional source signatures and measured near-field signatures may be designed and developed using various different programming languages and computer platforms and by varying different implementation parameters, including control structures, variables, data structures, modular organization, and other such parameters. The computational representations of wavefields, operators, and other computational objects may be implemented in different ways.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process for generating an image of a subterranean formation using marine seismic techniques in which a source is activated above the subterranean formation and the reflections from the subterranean formation are recorded as seismic data generated by receivers and a near-field signature of each pressure wave generated by a source element of the source is captured in a recording generated by a pressure sensor located within a near field of each source element, the specific improvement comprising:
   generating a modeled near-field signature for each source element, wherein the modeled near-field signature of a source element is a combination of modeled notional source signatures of each source element;
   combining a low-frequency portion of the recorded near-field signature with a high-frequency portion of the modeled near-field signature of each source element to generate a new recording corresponding to a new near-field signature of each source element, wherein the new near-field signature of each source element avoids an unreliable high-frequency portion of the recorded near-field signature and an unreliable low-frequency portion of the modeled near-field signature;
   computing notional source signatures of the source elements using the new near-field signatures, each notional source signature characterizing an isolated pressure wave generated by a source element without effects of pressure waves generated by other source elements and without free surface reflections;
   determining a source pressure wavefield from the notional source signatures; and
   generating an image of the subterranean formation based on the source pressure wavefield and the seismic data.

2. The process of claim 1, wherein the source elements are air guns selected with chamber volumes, air gun spacings, and positions within in the source to dampen bubble oscillations of the pressure wave generated by each of the source elements.

3. The process of claim 1, wherein the number of source elements equals the number of pressure sensors.

4. The process of claim 1, further comprising:
   comparing the modeled near-field signature to the recorded near-field signature in a frequency domain using spectral coherence to determine a range of frequencies over which the recorded near-field signature and the modeled near-field signature are in agreement; and
   scaling the recorded near-field signature to the modeled near-field signature using the modeled and recorded near-field signatures over the range of frequencies, when calibration of pressure sensors of the acoustic source are unknown.

5. The process of claim 1, comprising:
   comparing the modeled near-field signature to the recorded near-field signature in a frequency domain using spectral coherence to determine a range of frequencies over which the recorded near-field signature and the modeled near-field signature are in agreement;
   converting the measured near-field signatures to a pressure unit; and
   scaling the modeled near-field signature to the recorded near-field signature using the modeled and recorded near-field signatures over the range of frequencies, when calibration of pressure sensors of the acoustic source are known.

6. The process of claim 1, comprising:
   transforming the modeled near-field signature from a time domain to a frequency domain; and transforming the recorded near-field signature from the time domain to the frequency domain.

7. The process of claim 1, wherein combining the low-frequency portion of the recorded near-field signature with the high-frequency portion of the modeled near-field signature of each source element comprises combining the low-frequency portion of the recorded near-field signature with the high-frequency portion of the modeled near-field signature of each source element in a frequency domain.

8. The process of claim 1, wherein combining the low-frequency portion of the recorded near-field signature with the high-frequency portion of the modeled near-field signature of each source element comprises summing the recorded near-field signature multiplied by a first weight function and a scale factor with the modeled near-field signature multiplied by a second weight function, the first weight function greater than the second weight function for small frequencies and the first weight function less than the second weight function for large frequencies.

9. The process of claim 1, wherein computing the notional source signatures of each of the source elements using the new near-field signatures of the source elements comprises transforming the new near-field signatures from a frequency domain to a time domain.

10. A computer system for computing an image of a subterranean formation from recorded seismic data collected in a marine seismic survey of the subterranean formation, the system comprising:
one or more processors;
one or more data-storage devices; and
machine-readable instructions stored in the one or more data-storage devices that when executed using the one or more processors controls the system to carry out
generating a modeled near-field signature for each source element of a source activated above the subterranean formation in a body of water, wherein the modeled near-field signature of each source element is a combination of modeled notional source signatures of each source element;
combining a low-frequency portion of the recorded near-field signature with a high-frequency portion of the modeled near-field signature of each source element to generate a new recording corresponding to a new near-field signature of each source element;
computing notional source signatures of the source elements using the new near-field signatures, each notional source signature characterizing an isolated pressure wave generated by a source element without effects of pressure waves generated by other source elements and without free surface reflections;
determining a source pressure wavefield from the notional source signatures; and
generating an image of the subterranean formation based on the source pressure wavefield and seismic data generated by receivers that detect reflections from the subterranean formation in response to activation of the source.

11. The system of claim 10, wherein the source elements are air guns selected with chamber volumes, air gun spacings, and positions within in the source to dampen bubble oscillations of the pressure wave generated by each of the source elements.

12. The system of claim 10, wherein the number of source elements equals the number of pressure sensors.

13. The system of claim 10, further comprising:
comparing the modeled near-field signature to the recorded near-field signature in a frequency domain using spectral coherence to determine a range of frequencies over which the recorded near-field signature and the modeled near-field signature are in agreement; and
scaling the recorded near-field signature to the modeled near-field signature using the modeled and recorded near-field signatures over the range of frequencies, when calibration of pressure sensors of the acoustic source are unknown.

14. The system of claim 10, comprising:
comparing the modeled near-field signature to the recorded near-field signature in a frequency domain using spectral coherence to determine a range of frequencies over which the recorded near-field signature and the modeled near-field signature are in agreement;
converting the measured near-field signatures to a pressure unit; and
scaling the modeled near-field signature to the recorded near-field signature using the modeled and recorded near-field signatures over the range of frequencies, when calibration of pressure sensors of the acoustic source are known.

15. The system of claim 10, comprising:
transforming the modeled near-field signature from a time domain to a frequency domain; and
transforming the recorded near-field signature from the time domain to the frequency domain.

16. The system of claim 10, wherein combining the low-frequency portion of the recorded near-field signature with the high-frequency portion of the modeled near-field signature of each source element comprises combining the low-frequency portion of the recorded near-field signature with the high-frequency portion of the modeled near-field signature of each source element in a frequency domain.

17. The system of claim 10, wherein combining the low-frequency portion of the recorded near-field signature with the high-frequency portion of the modeled near-field signature of each source element comprises summing the recorded near-field signature multiplied by a first weight function and a scale factor with the modeled near-field signature multiplied by a second weight function, the first weight function greater than the second weight function for small frequencies and the first weight function less than the second weight function for large frequencies.

18. The system of claim 10, wherein computing the notional source signatures of each of the source elements using the new near-field signatures of the source elements comprises transforming the new near-field signatures from a frequency domain to a time domain.

19. An apparatus for generating an image of a subterranean formation from recorded seismic data collected in a marine seismic survey of the subterranean formation and a near-field signature of each pressure wave generated by a source element of the source and recorded by a pressure sensor located within a near field of each source element, the apparatus comprising:
means for generating a modeled near-field signature for each source element, wherein the modeled near-field signature of a source element is a combination of modeled notional source signatures of each source element;
means for combining a low-frequency portion of the recorded near-field signature with a high-frequency portion of the modeled near-field signature of each source element to generate a new recording corresponding to a new near-field signature of each source element;

means for computing notional source signatures of the source elements using the new near-field signatures, each notional source signature characterizing an isolated pressure wave generated by a source element without effects of pressure waves generated by other source elements and without free surface reflections;

means for determining a source pressure wavefield from the notional source signatures; and means for generating an image of the subterranean formation based on the source pressure wavefield and the seismic data.

20. The system of claim 10, wherein the source elements are air guns selected with chamber volumes, air gun spacings, and positions within in the source to dampen bubble oscillations of the pressure wave generated by each of the source elements.

21. The system of claim 10, wherein the number of source elements equals the number of pressure sensors.

22. The system of claim 10, further comprising:

means for comparing the modeled near-field signature to the recorded near-field signature in a frequency domain using spectral coherence to determine a range of frequencies over which the recorded near-field signature and the modeled near-field signature are in agreement; and means for scaling the recorded near-field signature to the modeled near-field signature using the modeled and recorded near-field signatures over the range of frequencies, when calibration of pressure sensors of the acoustic source are unknown.

23. The system of claim 10, comprising:

means for comparing the modeled near-field signature to the recorded near-field signature in a frequency domain using spectral coherence to determine a range of frequencies over which the recorded near-field signature and the modeled near-field signature are in agreement;

means for converting the measured near-field signatures to a pressure unit; and means for scaling the modeled near-field signature to the recorded near-field signature using the modeled and recorded near-field signatures over the range of frequencies, when calibration of pressure sensors of the acoustic source are known.

24. The system of claim 10, comprising:

means for transforming the modeled near-field signature from a time domain to a frequency domain; and means for transforming the recorded near-field signature from the time domain to the frequency domain.

25. The system of claim 10, wherein the means for combining the low-frequency portion of the recorded near-field signature with the high-frequency portion of the modeled near-field signature of each source element combines the low-frequency portion of the recorded near-field signature with the high-frequency portion of the modeled near-field signature of each source element in a frequency domain.

26. The system of claim 10, wherein the means for combining the low-frequency portion of the recorded near-field signature with the high-frequency portion of the modeled near-field signature of each source element sums the recorded near-field signature multiplied by a first weight function and a scale factor with the modeled near-field signature multiplied by a second weight function, the first weight function greater than the second weight function for small frequencies and the first weight function less than the second weight function for large frequencies.

27. The system of claim 10, wherein the means for computing the notional source signatures of each of the source elements using the new near-field signatures of the source elements transforms the new near-field signatures from a frequency domain to a time domain.

* * * * *